United States Patent [19]
Wilken

[11] Patent Number: 4,719,876
[45] Date of Patent: Jan. 19, 1988

[54] RESTRAINT COLLAR

[76] Inventor: Frank T. Wilken, 24308 Shrewsbury Cir., Canoga Park, Calif. 91307

[21] Appl. No.: 870,913

[22] Filed: Jun. 5, 1986

[51] Int. Cl.⁴ ............................................. A01K 27/00
[52] U.S. Cl. ............................ 119/106; 128/DIG. 15
[58] Field of Search ............... 119/106; 128/76 R, 77, 128/97, 165, DIG. 15

[56] References Cited

U.S. PATENT DOCUMENTS

| | | | |
|---|---|---|---|
| 3,696,810 | 10/1972 | Gaylord, Jr. ........... | 128/DIG. 15 X |
| 4,576,150 | 3/1986 | Auracher ............... | 128/DIG. 15 X |
| 4,592,158 | 6/1986 | Seely .................................. | 40/606 X |

FOREIGN PATENT DOCUMENTS 1191748  8/1985  Canada .................................. 119/106

Primary Examiner—Robert P. Swiatek
Attorney, Agent, or Firm—Roger A. Marrs

[57] ABSTRACT

A collar is disclosed herein for restricting the movement of an animal's head which comprises a pliable and thickened elongated pad of sufficient width to occupy a neck region of the animal substantially between the shoulder and the base of the head. The opposite ends of the pad carry a releasable closure for securing the collar about the animal's neck. The closure includes a hook and pile fastener joining the ends longitudinally as well as transversely to prevent inadvertent detachment of overlapped ends.

1 Claim, 5 Drawing Figures

RESTRAINT COLLAR

BACKGROUND OF THE INVENTION

1. Field of the Invention

The present invention relates to animal restraint devices and, more particularly, to a novel collar adapted to be worn about the neck of an animal intended to prevent the animal's head from turning rearward.

2. Brief Description of the Prior Art

In the past, it has been the conventional practice to employ a collar intended to prevent the animal's head from turning rearwardly so as to avoid the animal biting or nipping at operational stitches, hot spots, skin rashes or the like. It is the nature of an animal to want to lick or remove items such as stitches, bandages, or the like from the back, stomach or hindquarters. Obviously, such action would undo any medical procedure that was performed on the animal.

Some attempts have been made to provide devices which are worn about the neck of the animal so as to restrict or prevent the turning of the animal's head. Such devices generally take the form of a conically shaped, thin plastic member which when strapped about the animal's neck radiates outwardly and extends beyond the normal contour of the animal's body. Problems and difficulties have been encountered when using such a device which stem largely from the fact that due to the extreme size of the device, walking by the animal is greatly restricted and many times the animal's ability to eat from a bowl or dish is restricted. Furthermore, should the animal run or walk, the animal's gait is extremely awkward and passage through narrow walkways or access doors is greatly restricted. Such prior collars generally interfere with such passageways and doors so that the animal is sometimes injured when attempting to traverse such an area. In other instances, the thin edge of the plastic has a tendency to cut or bear into the skin of the animal which, again, causes irritation and injury.

Therefore, a long-standing need has existed to provide a suitable collar to be worn about the neck of the animal which will not restrict his normal activities but will prevent extreme rearward disposition of the animal's head with respect to his body.

SUMMARY OF THE INVENTION

Accordingly, the above problems and difficulties are obviated by the present invention which provides an elongated thickened pad having closure means at its opposite ends so that the pad can be releasably carried about the neck of the animal. The width of the pad is substantially of the same dimension as the area of the animal's neck between his upper shoulder and the base of his head. The thickness of the pad is such that the pad will not readily fold or overlap upon turning of the animal's head rearward. A feature resides in providing a closure using a hook and pile fastener which couples the opposite ends of the pad longitudinally as well as transversely.

Therefore, it is among the primary objects of the present invention to provide a novel restraint collar for an animal which will readily and effectively prevent the animal's head from turning rearwardly without interfering with the animal's walking or feeding habits and which will not prevent passage through doors or passageways normally accommodating the body of the animal.

Yet another object of the present invention is to provide a novel restraint collar which is inexpensive to manufacture and which may readily be fastened about the neck of an animal by a person not having skill.

A further object is to provide a novel closure means for a restraint collar which cannot be opened or dislodged by an animal while the animal is wearing the collar on his neck.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

Figure 1:
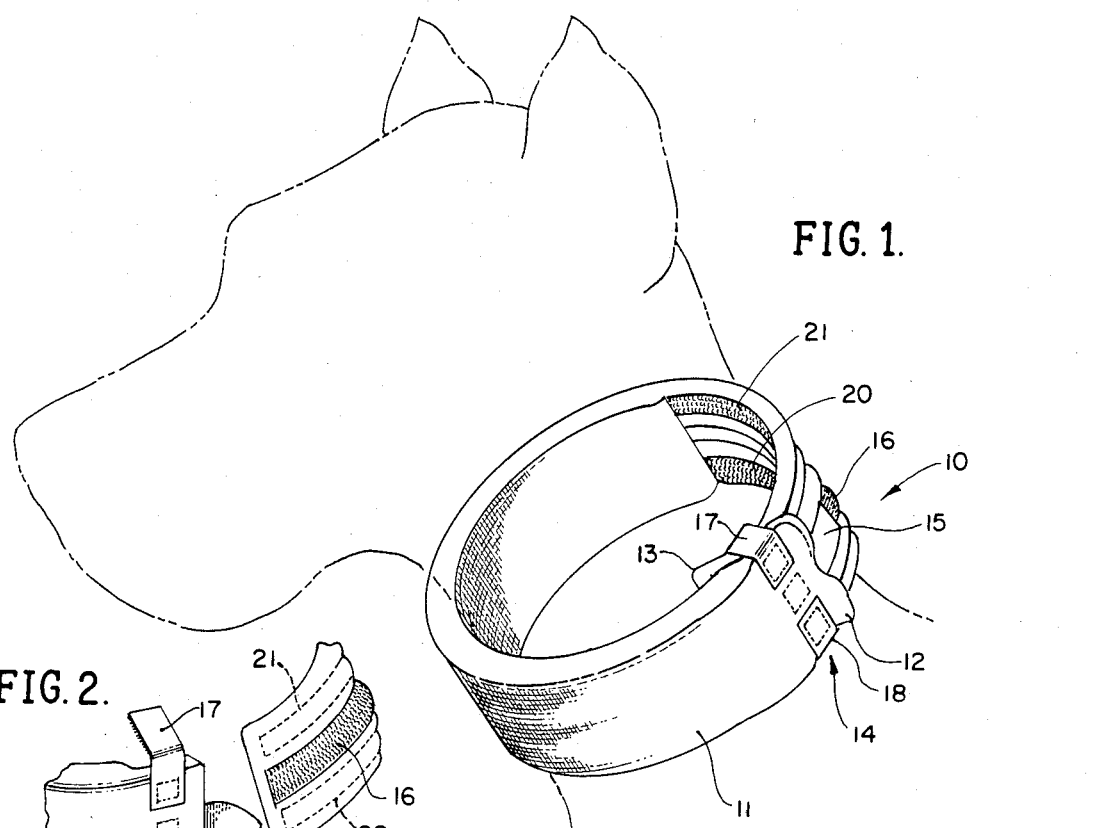
FIG. 1 is a front perspective view of the novel restraint collar illustrated about the neck of an animal.

Referring now in detail to FIG. 1, the novel restraint collar of the present invention is illustrated in the general direction of arrow 10 which includes an elongated thickened pad 11 having opposite ends 12 and 13 which are overlapped and joined together by a fastening means broadly indicated by the numeral 14. The width of the pad 11 is such that the area of the animal's neck between his shoulder and base of the head is substantially occupied by the thickness of the pad. Also, the thickness of the pad is such that the pad will not double over upon itself easily although the pad is pliable to accommodate wrapping around the neck of the animal.

Figure 2:
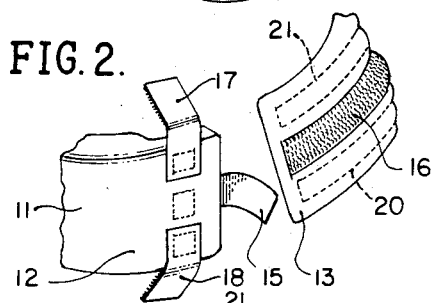
FIG. 2 is an exploded view of the opposite ends of the collar preparatory to attachment.

FIG. 2 more clearly illustrates the closure means for joining the opposite ends 12 and 13 of the pad 11. The closure means takes the form of a hook and pile fastener wherein a strap 15 is carried on the end of pad 11 and lies along the central longitudinal axis of the pad. Strap 15 is intended to close with strap 16 which is carried along the central longitudinal axis of the end 13. Therefore, straps 15 and 16 are located on the extreme opposite ends of the pad 11 and lie midway between the opposite longitudinal edges of the pad. Strap 15 is carried on the inside surface of the pad while strap 16 is carried on the external surface so that when the end 12 overlaps with the end 13, the straps will join in a closure typical of hook and pile fastening. Because of the hook and pile fastening, adjustment to the size of the animal's neck is assured.

FIG. 2 also shows that in addition to the longitudinal closure means represented by straps 15 and 16, a transverse closure means is provided in the form of straps 17 and 18 which are carried on the outside surface of end 12 and which are intended to close with strips 20 and 21 carried on the inside surface of end 13. By this means, both longitudinal and transverse closure of the opposite ends 12 and 13 are achieved when overlapped so that the animal cannot use the paw for dislodging the fastening means or for detaching the fastening means from its closure position.

Figure 3:
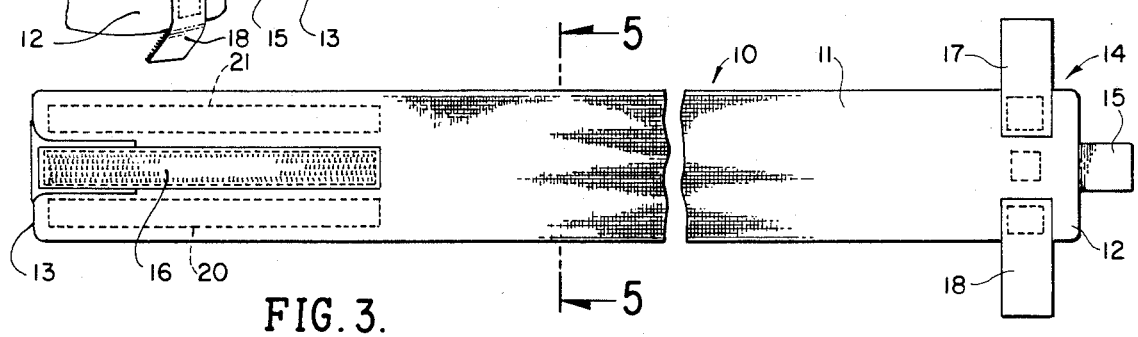
FIG. 3 is a lay-out elevational view of the restraint collar showing the external surface thereof.
Figure 4:
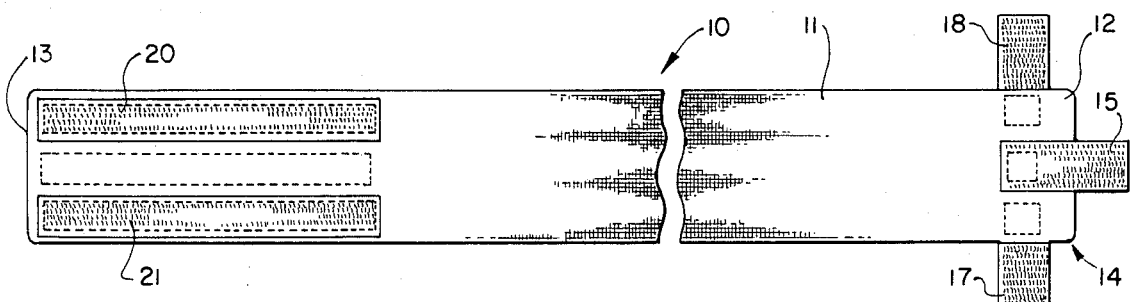
FIG. 4 is a lay-out elevational view of the restraint collar showing the inner surface thereof.

Referring now in detail to FIGS. 3 and 4, it can be seen that the fastener strips 16, 20 and 21 lie substantially parallel to one another and that the strip 16 is on the outside surface of pad 11 while, as shown in FIG. 4, the strips 20 and 21 are on the inside of the pad. The strips 16, 20 and 21 may represent the hook portion of the hook and pile fastener while the strips 15, 17 and 18 represent the pile portion of the fastener. It is also within the scope of the invention to reverse the hook and pile portions if desired.

Figure 5:
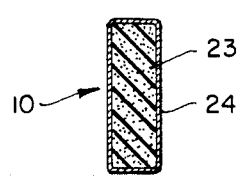
FIG. 5 is a transverse cross-sectional view of the pad employed in the collar as taken in the direction of arrows 5—5 of FIG. 3.

Referring now in detail to FIG. 5, it can be seen that the collar 10 comprises a thick, pliable and resilient material 23 such as may be represented by a cellular composition. The composition is covered by a suitable fabric 24 so that the pad is somewhat pliable and cushioned. However, it is to be understood that the pad is of sufficient thickness to avoid overlapping when placed under pressure by the turning of the animal's head. Therefore, a substantial restraint is provided because of the thickness of the collar as it is forced into a tentative overlapping position when the animal so forces it. Because of the thickness, the animal's head cannot move rearwardly with respect to his body because the accumulated thickness of the fold is more than the area between the base of the animal's head and his shoulder can accommodate during the turn.

Preferably, the fabric is composed of a material which may be readily cleaned such as by washing and, if desired, the covering can be made to be removable from the cushion material 23. The longitudinal and transverse hook and pile fastening means eliminates the need for buckles and alignment or registering of fastener parts such as would normally be required when employing a snap fastener or a strap with holes intended to receive a tang of a buckle.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An animal restraint collar limiting the movement of the animal's head with respect to his body, the combination comprising:
   an elongated pad having opposite ends adapted to be overlapped to provide a continuous collar about the animal's neck between the shoulder and the base of the neck;
   said pad being of substantial width and thickness to gather into a restrictive fold limiting rearward movement of the animal's head;
   double closure means carried on the respective opposite ends of said pad for releasably joining said ends together;
   said double closure means includes a first hook and pile fastener means arranged to close along the longitudinal axis of said elongated pad and a second hook and pile fastener means arranged to close transversely about the overlapped ends of said pad;
   said pad is composed of a soft, pliable cushion material covered with a fabric and said pad width is at least three times the dimensional thickness of said pad;
   said double closure means being carried on said fabric stitched into said cushion material;
   said longitudinal fastener means includes a hook strip carried on one of said pad ends midway between opposite edges thereof and a pile strip carried on the other pad end midway between the opposite edges thereof whereby said hook strip and said pile strip are in alignment when said opposite ends are overlapped;
   said transverse fastener means includes at least two sets of hook strips arranged on said opposite edges of said one pad end extending normally to said longitudinal strips and at least two sets of pile strips arranged in parallel spaced apart relationship secured to said other pad end and said sets of hook strips adapted to extend over said overlapped pad edges to releasably engage with said pile strips; and
   said transverse fastener means hook strips carried on the outer or external surface of said one pad end while said transverse fastener means pile strips are carried on the inner or internal surface of said other pad end whereby said hook strips fold over said overlapped pad ends from the external side to join with said pile strips on the inner side of said overlapped pad ends.

* * * * *